United States Patent [19]

Matsushita et al.

[11] Patent Number: 4,614,852
[45] Date of Patent: Sep. 30, 1986

[54] ELECTROMAGNETIC INDUCTION HEATING COOKING UTENSIL

[75] Inventors: Kenyo Matsushita; Hiroshi Ishida, both of Ihara, Japan

[73] Assignee: Nippon Light Metal Company Limited, Tokyo, Japan

[21] Appl. No.: 760,586

[22] Filed: Jul. 30, 1985

[51] Int. Cl.$^4$ .......... A47J 27/00; B65D 25/34; H05B 6/12

[52] U.S. Cl. .......... 219/10.49 R; 219/10.67; 126/390; 220/455; 220/456

[58] Field of Search .......... 220/455, 456, 454; 126/390; 219/10.49 R, 10.67

[56] References Cited

U.S. PATENT DOCUMENTS

| | | | |
|---|---|---|---|
| 2,969,452 | 1/1961 | Geller et al. | 126/390 X |
| 4,350,259 | 9/1982 | Cartossi | 126/390 X |
| 4,533,807 | 8/1985 | Minamida | 126/390 X |
| 4,564,001 | 1/1986 | Maeda | 126/390 |

FOREIGN PATENT DOCUMENTS 111867 6/1984 European Pat. Off. .......... 220/454

OTHER PUBLICATIONS

"The Clean Range" by Masahiro Hibino et al.; Mitsubishi Electric Advance, vol. 1, No. 9, Sep. 1977; pp. 22, 23.

Primary Examiner—Allan N. Shoap
Attorney, Agent, or Firm—William J. Daniel

[57] ABSTRACT

A cooking utensil for heating by electromagnetic induction comprises an aluminum or aluminum alloy vessel having at its bottom a spray coated layer of iron and a spray coated layer of aluminum or an aluminum alloy covering the iron layer.

3 Claims, 1 Drawing Figure

U.S. Patent  Sep. 30, 1986  4,614,852
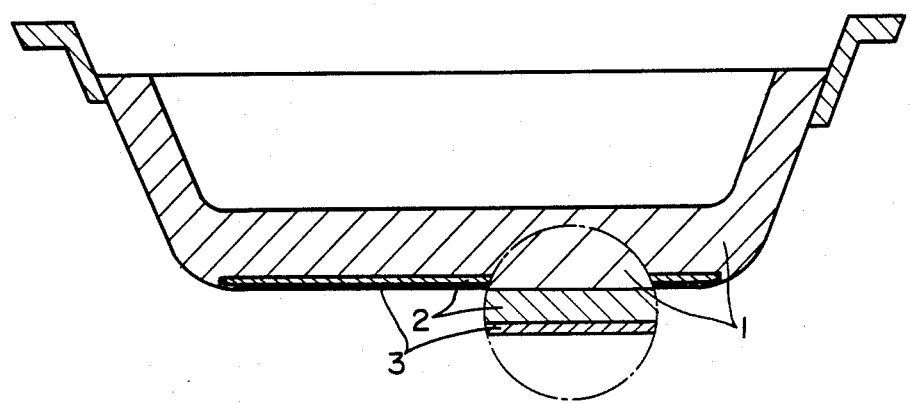

ELECTROMAGNETIC INDUCTION HEATING COOKING UTENSIL

BACKGROUND OF THE INVENTION

1. Field of the Invention

This invention relates to a cooking utensil which is suitable for heating by electromagnetic induction.

2. Description of the Prior Art

There is known a cooking utensil of the type which is subjected to a magnetic field induced by an exciter and heated by the heat appearing as a result of eddy-current loss. The conventional cooking utensils of this type used to be made of iron, e.g. cast iron or enameled iron, or 18Cr-8Ni or 18Cr stainless steel. The housewives, however, complained that they were heavier than those made of other materials. Moreover, the utensils made of iron were liable to rusting, and those made of enameled iron were likely to have the enamel separated from the iron.

There has been proposed the use of aluminum, which has been used for making a variety of cooking utensils, for making a cooking utensil for heating by electromagnetic induction, too. It comprises a vessel made of aluminum and having a bottom to which a different magnetic metal is bonded. It, however, still has a lot of drawbacks. The metal bonded to the bottom is liable to rusting and separation from the aluminum body. The bonding of the metal makes the utensil awkward in appearance and expensive to manufacture. Moreover, it is not comparable to a cooking pan of iron or enameled iron in heating efficiency unless its magnetic metal layer has a considerably large thickness. Therefore, it does not contribute very much to reducing the weight of an iron or stainless steel utensil.

SUMMARY OF THE INVENTION

It is an object of this invention to provide a cooking utensil for heating by electromagnetic induction which is comparable to any conventional iron or enameled iron utensil in heating efficiency, and yet lightweight and easy to handle by the housewife, which is free from any possibility of rusting or layer separation, and which is easy and inexpensive to manufacture.

This object is attained by a cooking utensil comprising a vessel made of aluminum or an aluminum alloy and having at its bottom a spray coated layer of a magnetic material, such as iron, and a spray coated layer of aluminum or an aluminum alloy formed on the magnetic material layer.

BRIEF DESCRIPTION OF THE DRAWING

The drawing is a vertical sectional view of a cooking utensil embodying this invention, in which a part thereof is enlarged.

DETAILED DESCRIPTION OF THE INVENTION

Referring to the drawing, a cooking utensil embodying this invention comprises a vessel 1 made of aluminum. The vessel 1 has at its bottom a magnetic layer 2 formed by spray coating from a magnetic material, such as iron or cast iron, and a nonmagnetic layer 3 formed by spray coating from aluminum on the magnetic layer 2.

The heating efficiency and power consumption of the utensil depend on the thicknesses of the magnetic and nonmagnetic layers 2 and 3. The inventors of this invention have conducted a lot of tests in this connection and found that the utensil would achieve the highest heating efficiency with the smallest power consumption if the magnetic layer 2 has a thickness of 0.37 to 0.71 mm and the nonmagnetic layer 3 has a thickness of 0.1 mm. The tests and their results will hereunder be described.

Test Series I—Comparison of different types of utensils in time required for heating 0.5 liter of water from 20° C. to 90° C.

| Utensil | Heating time |
| --- | --- |
| Aluminum pan formed at its bottom with a spray coated layer of iron having a thickness of 0.60 ± 0.04 mm | 4 min. 31 sec. |
| Aluminum pan formed at its bottom with a spray coated layer of iron having a thickness of 0.60 ± 0.04 mm and a spray coated layer of aluminum formed on the iron layer and having a thickness of 0.10 ± 0.02 mm | 3 min. 36 sec. |
| Enameled iron pan | 3 min. 25 sec. |
| Aluminum pan formed at its bottom with a spray coated layer of iron having a thickness of 1.0 ± 1.2 mm | 3 min. 35 sec. |

As is obvious from these results, no aluminum pan having only a layer of a magnetic material, such as iron, was comparable to the enameled iron pan in heating efficiency, unless the layer had a thickness of at least about 1.0 mm. The layer of such thickness not only added to the weight of the pan, but also was easy to separate from the aluminum body. On the other hand, if the layer had a thickness of 0.5 to 0.6 mm, it was unliable to easy separation and easy and inexpensive to produce. The aluminum pan having only an iron layer of such small thickness was, however, lower in heating efficiency.

As a result of further study, therefore, the inventors have found that if a nonmagnetic layer of aluminum having a thickness not exceeding 1 mm is formed on the iron layer having a thickness of, say, 0.4 to 0.6 mm, the aluminum pan is comparable to the enameled iron pan in heating efficiency, as is obvious from the table which has hereinabove appeared. This construction contributes to reducing the weight of the pan and preventing any easy separation of the iron layer. It also enables an improvement in productivity and a reduction in the cost of production. It is also helpful for lowering the power consumtion of the pan, as is obvious from the test results which will hereunder appear.

Test Series II—Comparison in power consumption of various combinations of 120 mm square aluminum sheets having various thicknesses and iron sheets having various thicknesses.

| Sheet thickness (mm) | Power consumption (W) |
| --- | --- |
| Fe 0.30 ± 0.02; Al 0.10 ± 0.02 | No heating was possible. |
| Fe 0.40 ± 0.07; Al 0.05 ± 0.008 | 440 |
| Fe 0.40 ± 0.07; Al 0.07 ± 0.008 | 820 |
| Fe 0.40 ± 0.07; Al 0.10 ± 0.02 | 820 |
| Fe 0.40 ± 0.07; Al 0.17 ± 0.03 | 820 |
| Fe 0.40 ± 0.07; Al 0.24 ± 0.03 | No heating was possible. |
| Fe 0.70 ± 0.10; Al 0.05 ± 0.008 | 450 |
| Fe 0.70 ± 0.10; Al 0.07 ± 0.008 | 820 |
| Fe 0.70 ± 0.10; Al 0.10 ± 0.02 | 820 |
| Fe 0.70 ± 0.10; Al 0.17 ± 0.03 | 820 |
| Fe 0.70 ± 0.10; Al 0.24 ± 0.03 | No heating was possible. |
| Fe 1.00 ± 0.18; Al 0.10 ± 0.02 | 830 |
| Fe 1.00 ± 0.18; Al 0.24 ± 0.03 | No heating was possible. |

Basically the same results were obtained when the magnetic layer was of materials other than iron, and also when the pan was made of an aluminum alloy.

The following advantages were found to be available when the magnetic layer had a thickness of 0.4 to 0.7 mm, and was covered by an aluminum layer having a thickness of 0.062 to 0.20 mm:

(1) The pan of this invention has the following advantages over the conventional pan to which a layer of a magnetic material, such as iron, is bonded:
  (a) It is free from any separation between the two metals or corrosion caused by their difference in coefficient of thermal expansion, and is, therefore, very good in appearance;
  (b) It is free from any possibility of rusting or corrosion by a brazing material; and
  (c) It is higher in productivity and less expensive.
(2) It has the following advantages over any other pan made by spray coating:
  (a) A higher heating efficiency;
  (b) There is no possibility of separation of the spray coated layer or its rusting; and
  (c) A more pleasant appearance.

What is claimed is:

1. A cooking utensil for heating by electromagnetic induction comprising a vessel made of a material selected from the group consisting of aluminum and an aluminum alloy, said vessel having at its bottom a spray coated layer of a magnetic material having a thickness of about 0.4–0.7 mm and a spray coated layer of a material selected from the group consisting of aluminum and an aluminum alloy covering said layer of a magnetic material and having a thickness from about 0.1 up to not more than 1.0 mm.

2. A cooking utensil as set forth in claim 1, wherein said layer of a magnetic material has a thickness of 0.37 to 0.71 mm and said layer covering it has a thickness of 0.062 to 0.20 mm.

3. A cooking utensil as set forth in claim 1, wherein said magnetic material is iron.